United States Patent
Komai

(10) Patent No.: US 6,634,591 B2
(45) Date of Patent: Oct. 21, 2003

(54) MAGNETIC TAPE CUTOUT APPARATUS AND METHOD

(75) Inventor: Hirokazu Komai, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/109,726

(22) Filed: Apr. 1, 2002

(65) Prior Publication Data

US 2002/0139892 A1 Oct. 3, 2002

(30) Foreign Application Priority Data

Apr. 2, 2001 (JP) ........................................ 2001-103333

(51) Int. Cl.[7] .............................................. B65H 19/26
(52) U.S. Cl. .................. 242/523.1; 242/534; 242/534.2
(58) Field of Search ............................. 242/523.1, 534, 242/534.2

(56) References Cited

U.S. PATENT DOCUMENTS 4,632,335 A * 12/1986 Dickson et al. ............. 242/534
4,894,733 A * 1/1990 Odaka ......................... 360/31

FOREIGN PATENT DOCUMENTS

JP         7-37362        2/1995

* cited by examiner

*Primary Examiner*—John M. Jillions
(74) *Attorney, Agent, or Firm*—Sughrue Mion, PLLC

(57) ABSTRACT

A magnetic tape cutout apparatus 10 having storing member for storing a position of a defect portion of an original roll of a magnetic tape, a winding apparatus 14 for reeling off the magnetic tape from the original roll and winding the magnetic tape as a product and discharging member 17 for removing the product including the defect portion based on information of a position of a defect of the storing member.

8 Claims, 2 Drawing Sheets

MAGNETIC TAPE CUTOUT APPARATUS AND METHOD

BACKGROUND OF THE INVENTION

The present invention relates to a magnetic tape cutout apparatus and method for cutting-out a magnetic tape from an original roll (defined by winding an original tape into a roll shape) and winding the magnetic tape (thus cut-out from the original roll) to a reel. In the apparatus and method, the magnetic tape is wound on the reel at inside of a magnetic tape cassette or a cartridge or is previously wound at the outside and then installed in the cassette or the cartridge.

There is a case in which a defect is caused in a magnetic tape by a nonuniformity of coating by adhering dust when a magnetic material is coated to a wab/substrate and presence or absence of the defect is inspected at a stage of an original roll.

Further, according to a magnetic tape used for backup of data, a servo signal is previously recorded thereon and in such a magnetic tape, a writing error of the servo signal also constitutes a defect and therefore, presence or absence of the defect of the written servo signal is inspected.

As a magnetic tape cutout apparatus, there is an apparatus described in Japanese Patent Unexamined Publication No. Hei. 7-37362. According to the apparatus, a tape of a predetermined length in accordance with a product is cut out from an original roll that has been previously recognized with a position of the defect of the magnetic tape by inspection, and the tape is wound to a reel at inside of a cassette.

According to the apparatus, the position of the defect is recognized by being stored to a storing member and when the defect is not present within the predetermined length of the cut-out magnetic tape, the predetermined length of the magnetic tape is wound to the reel (to be a product reel) at the inside of the cassette. Meanwhile, when there is present the defect within the predetermined length of the cut-out magnetic tape, the magnetic tape is wound to an abandon reel for abandoning the predetermined length of the magnetic tape. Winding of the magnetic tape to the product reel and winding of the magnetic tape to the abandon reel are carried out in the same winding apparatus (winder).

At inside of the above-described winding apparatus, there are mounted a mechanism for winding the magnetic tape to the product reel, a mechanism for winding the magnetic tape to the abandon reel and a mechanism for guiding the magnetic tape, that has been drawn out from the original roll, to either of the product reel and the abandon reel. In such a winding apparatus, the inner structure is extremely complicated, facility cost is high and also the maintenance is complicated.

SUMMARY OF THE INVENTION

The invention has been carried out in view of the above-described situation and it is an object thereof to provide a magnetic tape cutout apparatus and method capable of reducing cost and facilitating handling thereof.

The above-described object of the invention is achieved by a magnetic tape cutout apparatus comprising:
  storing member for storing a defect position of a defect portion in an original roll from which a magnetic tape is cut out;
  a winding apparatus for drawn out the magnetic tape thus cut-out from the original roll and for winding the magnetic tape on a reel; and
  discharging member for removing the reel including the defect portion in accordance with information of the defect position from the storing member.

Further, the above-described object of the invention is achieved by a magnetic tape cutout method including the steps of:
  previously storing in a storing member a defect position of a defect portion in an original roll from which a magnetic tape is cut-out;
  drawing out the magnetic tape thus cut out from the original roll and winding the magnetic tape on a reel; and
  removing the reel with the magnetic tape including the defect portion in accordance with information of the defect position from the storing member.

According to the above-described constitution, all of the magnetic tape are successively wound on reels as the products and thereafter, based on the information of the defect position of the storing member, the reel as product including the defect portion can be removed.

According to the winding apparatus of the invention, a mechanism for winding a magnetic tape to an abandon reel, a mechanism for guiding the magnetic tape drawn out from the original roll to either of a product reel and an abandon reel and the like may not be provided and therefore, the structure becomes simple as compared with the conventional apparatus.

As the discharging member, there can be adopted a constitution in which based on the defect position information of the storing member, the product including the defect portion is removed from a transfer line and also the structure is simple. Therefore, the facility cost can be reduced. Also the maintenance is easy to carry out and handling thereof is facilitated.

Further, comprehensively, the productivity can be maintained or promoted.

Apparently, it seems that the yield is lowered by winding all the magnetic tapes with no concern of the defect portion. However, the inventors have conceived the invention by converting conception. When the defect position information recognized in the state of the original roll, is used, the product including the defect portion can be removed extremely easily. Further, at the winding apparatus, the magnetic tape can be wound at high speed with no concern of the defect portion. Therefore, comprehensively, the productivity can be maintained or promoted.

For example, in a procedure of winding a magnetic tape to a reel at inside of a cassette by the winding apparatus and transferring the magnetic tape along with the cassette from the winding apparatus to a successive machine or step, the product including the defect portion may be abandoned along with the cassette or the reel may be taken out from the cassette and only the reel may be abandoned.

Note that according to the present invention the tape is not limited to be wound at inside of the cassette. The tape can be wound on the reel at outside of the cassette and then the reel may be installed in the cassette.

For example, there can be constructed a constitution in which a cassette is provided with a pertinent identification code and by reading the identification code, discharging member recognizes whether the cassette is to be abandoned.

DETAILED DESCRIPTION OF THE PREFERRED EMBODIMENT

An explanation will be given of an embodiment of the invention in reference to the drawings as follows.

Figure 1:
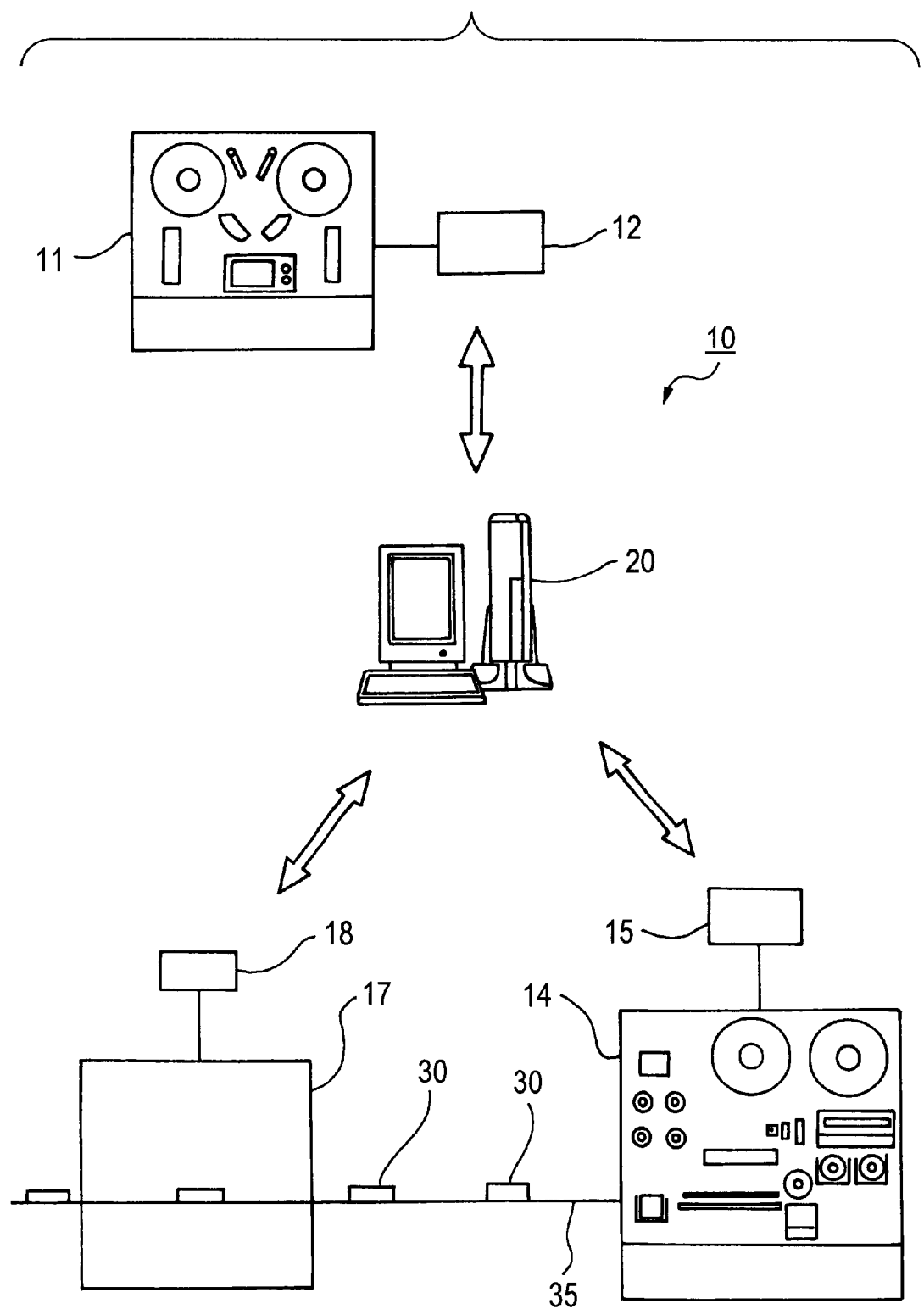
FIG. 1 is a conceptual view showing an embodiment of the invention.

FIG. 1 is a constitution view of a magnetic tape cut-out system 10 constituting the embodiment of the invention. The system 10 includes a servo writer (servo signal writing apparatus) 11 having an inspection function, a winder (winding apparatus) 14 and a discharge station (discharging member) 17. The apparatus 11, 14 and 17 are connected by a network to a server 20 via an LAN cable or the like and are brought into a state of being communicatable to each other. As the server 20, there can be adopted a PC server constructed by, for example, a personal computer. Further, a mode of network connection is not limited to be of the above-described wired system but may be of a wireless system.

The servo writer 11 functions also as a defect inspecting apparatus. The servo writer 11 is controlled by a terminal 12 and is provided with a function of writing a servo signal to a magnetic tape of a pancake (original roll), reading the written servo signal and checking whether the servo signal is properly written. Further, information of a position of a defect portion which is not written with the servo signal properly is transmitted to the server 20 via the terminal 12.

Further, information of a length of the respective pancake is informed from the servo writer 11 and the terminal 12 to the server 20. As the length information, there can be adopted a constitution in which, for example, the magnetic tape of the pancake is partitioned in the longitudinal direction finely into a plurality of blocks of block 1, block 2, block 3, . . . block N and a number of the block indicates a length from a start end or a finish end of the magnetic tape. The above-described defect position information can be informed to the server 20 in a mode of stating, for example, "there is a defect at block N".

Further, there is informed an identification number (consecutive number or the like) for identifying which pancake of a plurality of pancakes successively written with servo signals by the servo writer 11, from the servo writer 11 and the terminal 12 to the server 20. The identification data can be constituted by, for example, bar code information or two-dimensional code information and displayed on the respective pancake.

In this way, the defect position information of the respective pancake is previously shared by the plurality of apparatus 11, 14 and 17 via the server 20.

The winder 14 is controlled by a terminal 15 and winds a normal portion of the magnetic tape to, for example, a reel at inside of a cartridge (lower half thereof) arranged at an inner portion of the apparatus. The lower half is previously provided with a pertinent identification code of a two-dimensional code or the like. The terminal 15 acquires the above-described defect position information from the server 20 and informs information indicating a behavior of the lower half or the reel at inside of the winder 14 to the server 20.

A reel finished with winding by the winder 14 is arranged at inside of the lower half 30, mounted on a belt conveyer (transfer line) 35 and is transferred to a successive step.

The discharge station 17 is controlled by a terminal 18 and removes to abandon the lower half 30 containing a reel including a defect portion of the magnetic tape among the lower halves 30 mounted on the belt conveyer 35 and successively transferred. Only the reel at inside of the lower half 30 may be abandoned and the lower half 30 may be reutilized. The terminal 18 acquires the above-described defect position information from the server 20 and informs information indicating the lower half 30 removed from above the belt conveyer 30 to the server 20.

Figure 2:
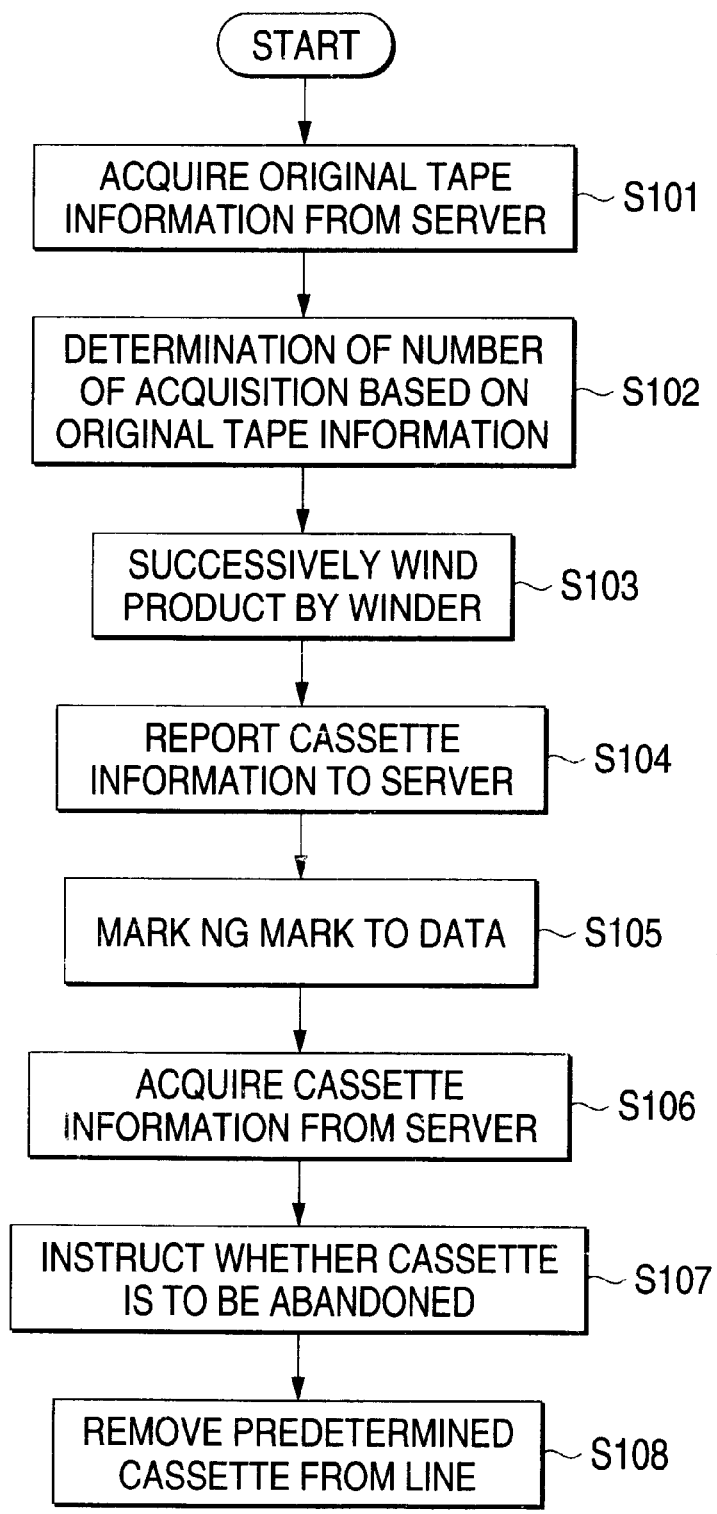
FIG. 2 is a flowchart for explaining an example of operation of the embodiment.

An explanation will be given of an example of operation of the magnetic tape cutout system 10 in reference to FIGS. 1 and 2.

First, in a state of charging the pancake transferred from the servo writer 11 to the winder 14, the terminal 15 acquires the length information and the defect position information of the pancake in reference to the identification number of the pancake (S101).

Next, the terminal 15 acquires the length of the magnetic tape wound to the pancake based on the acquired pancake information and determines how many product reels are to be wound therefrom. The number of product reels to be wound of course, depends on the type of product. For example, the length of the tape wound on a 90 min. tape may be longer than the length of tape wound on a 60 min. tape. Therefore, a number of acquisition is determined (S102).

Further, the winder 14 winds the product reel (S103), cuts the magnetic tape from the wound product and transfers the product onto the conveyer 35. At this occasion, the length information of the magnetic tape drawn out from the pancake is reported to the server 20 (S104).

Further, at the terminal 15, the length information and the defect position information reported from the winder 14 is referred and when it is determined that a defect portion is included in the magnetic tape drawn out from the pancake, the identification code of the lower half at this occasion is referred and the server 20 pertinently carries out writing or the like such that the fact that the reel including the defect portion is arranged in the lower half, can be recognized at a successive step. That is, predetermined data is marked with failure (NG) (S105).

Further, the marking may be carried out after finishing to wind all of the products of the number of acquisition, through the server 20.

Next, at the discharge station 17, the terminal 18 acquires information of the lower half 30 from the server 20 in reference to the identification code of the successively transferred lower half 30 (S106).

Further, the terminal 18 instructs whether the lower half 30 is to be abandoned, to the discharge station 17 based on the acquired information (S107).

Further, the discharge station 17 removes the predetermined lower half 30 from above the belt conveyer 35 based on instruction from the terminal 18 (S108).

Further, although operation of the magnetic tape cutout system is described in a time-sequential style for convenience of explanation, the servo writer 11, the winder 14 and the discharge station 17 are operated in parallel with each other and the server 20 controls the system such that the system is operated most efficiently by giving instruction to the respective apparatus.

According to the above-described system 10, by sharing information among the apparatus via the server 20, the respective apparatus can efficiently be operated, as a result, the yield can be promoted. As the winder 14 and the discharge station 17, there can be adopted constitutions having simple structures, for example, inexpensive ones or old type ones. This is because burden on the respective apparatus is alleviated by summarizing a plurality of apparatus to a single system by network connection.

Further, since NG is written to a predetermined file of the server 20, even when the lower half 30 is assumedly failed to remove at the discharge station 17, at a further successive step, at every time of referring to the identification code of the lower half 30, it is recognized that the lower half 30 is a failure. A possibility of erroneously delivering a failed product is extremely low.

Further, the invention is not limited to the above-described embodiment but can be modified and improved pertinently.

For example, instead of constituting the defect position information by a write detect position of a servo signal, a position of a defect of a nonuniformity in coating or the like found by inspection of a coating state may be used as defect position information or both of them may be used as defect position information.

Further, when an operator finds a defect which is not stored to the server, a failed product may be removed or data may be updated by manual operation. For example, discharging member may be mounted to the winding apparatus.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As has been explained above, according to the invention, there can be provided a magnetic tape cutout apparatus capable of reducing cost and facilitating handling thereof.

What is claimed is:

1. A magnetic tape cutout apparatus comprising:
   a storing member for storing a defect position of a defect portion of an original roll;
   a winding apparatus for drawing out a magnetic tape from the original roll and for winding the magnetic tape on a reel; and
   a discharging member for removing the reel including the defect portion in accordance with information regarding the defect position stored in the storing member.

2. The magnetic tape cutout apparatus according to claim 1, wherein said discharging member is located on a conveyor through which the reel is conveyed from the winding apparatus to a successive machine.

3. The magnetic tape cutout apparatus according to claim 1, wherein the information includes:
   an identification number of the original roll; and
   an identification number of a magnetic tape cassette half on which the reel is installed.

4. The magnetic tape cutout apparatus according to claim 2, wherein the information includes:
   an identification number of the original roll; and
   an identification number of a magnetic tape cassette half on which the reel is installed.

5. A method for cutting out a magnetic tape comprising:
   storing on a storing member a defect position of a defect portion of an original roll;
   drawing out a magnetic tape from the original roll and winding the magnetic tape on a reel; and
   removing the reel including the defect portion in accordance with information regarding the defect position stored in the storing member.

6. The method according to claim 5, further comprising:
   conveying the reel from the winding apparatus to a successive machine,
   wherein said removing step is conducted while said reel is conveyed.

7. The method according to claim 5, wherein the information includes:
   an identification number of the original roll; and
   an identification number of a magnetic tape cassette half on which the reel is installed.

8. The method according to claim 6, wherein the information includes:
   an identification number of the original roll; and
   an identification number of a magnetic tape cassette half on which the reel is installed.

* * * * *